US006406531B1

(12) United States Patent
Bui et al.

(10) Patent No.: US 6,406,531 B1
(45) Date of Patent: Jun. 18, 2002

(54) COMPOSITIONS AND METHODS FOR SELECTIVE DEPOSITION MODELING

(75) Inventors: Loc V. Bui, Valencia; Vu Doan, Winnetka; Kelly Kwo, Valencia, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/520,661

(22) Filed: Mar. 7, 2000

Related U.S. Application Data

(62) Division of application No. 09/258,048, filed on Feb. 25, 1999.

(51) Int. Cl.$^7$ .................................................. C09K 1/00
(52) U.S. Cl. ............................. 106/287.35; 106/31.29; 106/31.3; 106/31.61; 106/31.62; 106/230; 106/270; 106/287.3; 524/227
(58) Field of Search ............................ 106/31.29, 31.3, 106/31.61, 31.62, 230, 270, 287.3, 287.35; 524/227

(56) References Cited

U.S. PATENT DOCUMENTS

| | | |
|---|---|---|
| 4,390,369 A | 6/1983 | Merritt et al. |
| 4,484,948 A | 11/1984 | Merritt et al. |
| 4,684,956 A | 8/1987 | Ball |
| 4,758,276 A | 7/1988 | Lin et al. |
| 4,830,671 A | 5/1989 | Frihart et al. |
| 4,835,208 A | 5/1989 | Ball |
| 4,851,045 A | 7/1989 | Taniguchi |
| 4,889,560 A | 12/1989 | Jaeger et al. |
| 5,000,786 A | 3/1991 | Matsuzaki |
| 5,006,170 A | 4/1991 | Schwarz et al. |
| 5,041,161 A | 8/1991 | Cooke et al. |
| 5,053,079 A | 10/1991 | Haxell et al. |
| 5,066,332 A | 11/1991 | Brown et al. |
| 5,084,099 A | 1/1992 | Jaeger et al. |
| 5,123,961 A | 6/1992 | Yamamoto |
| 5,124,719 A | 6/1992 | Matsuzaki |
| 5,162,490 A | 11/1992 | Drawert et al. |
| 5,185,035 A | 2/1993 | Brown et al. |
| 5,194,638 A | 3/1993 | Frihart et al. |
| 5,200,451 A | 4/1993 | Wright |
| 5,221,335 A | 6/1993 | Williams et al. |
| 5,223,026 A | 6/1993 | Schwarz, Jr. |
| 5,259,873 A | 11/1993 | Fujioka |
| 5,286,288 A | 2/1994 | Tobias et al. |
| 5,298,062 A | 3/1994 | Davies et al. |
| 5,350,446 A | 9/1994 | Lin et al. |
| 5,350,789 A | 9/1994 | Sagawa et al. |
| 5,354,368 A | 10/1994 | Larson, Jr. |
| 5,372,852 A | 12/1994 | Titterington et al. |
| 5,385,957 A | 1/1995 | Tobias et al. |
| 5,389,958 A | 2/1995 | Bui et al. |
| 5,397,388 A | 3/1995 | Fujioka |
| 5,405,438 A | 4/1995 | Fujioka |
| 5,409,530 A | 4/1995 | Kanbayashi et al. |
| 5,421,868 A | 6/1995 | Ayalia-Esquilin et al. |
| 5,455,326 A | 10/1995 | Parker |
| 5,507,864 A | 4/1996 | Jaeger et al. |
| 5,514,209 A | 5/1996 | Larson, Jr. |
| 5,531,819 A | 7/1996 | Sawada |
| 5,560,765 A | 10/1996 | Sawada |
| 5,574,078 A | 11/1996 | Elwakil |
| 5,597,856 A | 1/1997 | Yu et al. |
| 5,607,501 A | 3/1997 | Fujioka |
| 5,621,022 A | 4/1997 | Jaeger et al. |
| 5,624,483 A | 4/1997 | Fujioka |
| 5,645,632 A | 7/1997 | Pavlin |
| 5,662,736 A | 9/1997 | Sakai et al. |
| 5,667,568 A | 9/1997 | Sacripante et al. |
| 5,669,965 A | 9/1997 | Sawada et al. |
| 5,688,312 A | 11/1997 | Sacripante et al. |
| 5,700,313 A | 12/1997 | Larson, Jr. |
| 5,703,145 A | 12/1997 | Sagawa et al. |
| 5,750,604 A | 5/1998 | Banning et al. |
| 5,779,779 A | 7/1998 | Jolly |
| 5,780,528 A | 7/1998 | Titterington et al. |
| 5,782,966 A | 7/1998 | Bui et al. |
| 5,783,657 A | 7/1998 | Pavlin et al. |
| 5,783,658 A | 7/1998 | Banning et al. |
| 5,788,751 A | 8/1998 | Sawada |
| 5,855,836 A | 1/1999 | Leyden et al. |
| 6,132,665 A | * 10/2000 | Bui et al. ................... 106/31.3 |
| 6,133,353 A | * 10/2000 | Bui et al. ................... 523/161 |
| 6,347,257 B1 | * 2/2002 | Bedal et al. ................ 700/118 |

FOREIGN PATENT DOCUMENTS

| | | |
|---|---|---|
| EP | 819 739 | 2/1998 |
| EP | 844 287 | 5/1998 |
| EP | 867 487 | 9/1998 |
| EP | 869 161 | 10/1998 |
| JP | 62-295973 | 12/1987 |
| JP | 3-91572 | 4/1991 |
| JP | 5-125316 | 5/1993 |
| JP | 5-255630 | 10/1993 |
| JP | 7-109432 | 4/1995 |
| JP | 7-316479 | 12/1995 |
| JP | 8-165447 | 6/1996 |
| JP | 9-3377 | 1/1997 |
| JP | 9-71743 | 3/1997 |
| JP | 9-255905 | 9/1997 |
| WO | 91/10711 | 7/1991 |
| WO | 96/10051 | 4/1996 |
| WO | 96/13372 | 5/1996 |
| WO | 98/26013 | 6/1998 |

* cited by examiner

*Primary Examiner*—David Brunsman
(74) *Attorney, Agent, or Firm*—Ralph D'Alessandro

(57) ABSTRACT

Phase change compositions that are solid at ambient temperature and liquid at an elevated temperature above ambient temperature are disclosed for advantageous use in selective deposition modeling methods for building three-dimensional objects. A phase change composition according to the disclosed invention is a semi-crystalline component mixture having a freezing point of at least about 68° C., a melting point of at least about 88° C. and a viscosity of about 13 centipoise at 135° C. The composition includes a plurality of waxes having a broad melting point range and molecular weight range. Three-dimensional objects having minimal curl, delamination and stress cracks can be produced at a faster rate than heretofore known by using selective deposition modeling techniques employing the disclosed compositions.

55 Claims, No Drawings

COMPOSITIONS AND METHODS FOR SELECTIVE DEPOSITION MODELING

"This is a divisional of U.S. patent application No. 09/258,048 filed Feb. 25, 1999, now pending."

BACKGROUND OF THE INVENTION

1. Field of the Invention

The present invention relates to compositions and methods for building three-dimensional objects and, more particularly, to phase change compositions and selective deposition modeling methods for building three-dimensional objects utilizing such compositions.

2. Description of the Related Art

The art of building three-dimensional objects using selective deposition modeling methods is a rapidly-developing technology. In once known selective deposition modeling method, a phase change composition, i.e., a composition that is a solid at ambient temperature and a liquid at an elevated temperature above ambient temperature, is melted by heating and deposited in liquid form onto a build platform in a controlled environment to form a multi-layered three-dimensional object on a layer-by-layer basis. The composition is deposited onto the build platform using a modified ink jet print head having a multiplicity of nozzles, e.g., 352 nozzles. A computer program prescribes the configuration of each layer of the object and controls the nozzles from which material is deposited during the deposition of any given layer to meet that layer's configuration. The material of each layer at least partially solidifies as a successive layer of material is selectively deposited thereupon from the print head. In this manner, the object is formed layer-by-layer into a final object having a desired shape and cross-section.

3D Systems, Inc., the Assignee of the present invention, has previously developed apparatus, methods and compositions for the selective deposition modeling of three-dimensional objects as described above. Thus, PCT Patent Application No. WO 97-11835 to Earl et al., published Apr. 3, 1997, describes a rapid prototyping apparatus and method for building three-dimensional objects employing selective deposition modeling. PCT Patent Application No. WO 97-11837 to Ley-den et al., published Apr. 3, 1997, describes computer methods and apparatus for manipulating object and object support data and controlling object build styles for use in building three-dimensional objects by selective deposition modeling. U.S. Pat. No. 5,855,836 to Leyden, et al. issued Jan. 5, 1999, discloses phase change compositions for use in building three-dimensional objects by selective deposition modeling techniques. The contents of each of the above-noted published applications are expressly incorporated herein by reference.

Phase change compositions possessing specific physical properties are desirable in order to avoid various problems that can arise during and after creation of an object by selective deposition modeling techniques. The currently existing problems in building three-dimensional objects using selective deposition modeling are many. Such problems include curling of the object upon or after formation, cohesive failure of the support structures concurrently built with the object to support the object during the build process, adhesive failure or breaks between different materials constituting the object, the formation of stress cracks in the object, and delamination of layers constituting the object.

Important physical properties of a suitable phase change composition which influence the above include jetting viscosity, thermal stability at the jetting viscosity, melting point, softening point and softening range, freezing or solidification point, toughness, hardness, tensile strength and elongation.

A variety of factors influence success or failure at different stages of the build process. Initially, various constraints are imposed at the dispensing or jetting point of the process. It is currently eminently desirable to increase the existing deposition rates of build compositions, i.e. to significantly increase the jetting rate or speed of deposition of the build compositions, which requires compositions that are thermally stable and low in viscosity at high temperatures. During the build process itself, it is important to avoid curling, cracking and delamination of the multi-layered object as it forms and solidifies layer-by-layer. Finally, it is important to provide a finished three-dimensional article having the requisite toughness such that the product does not break or crumble easily with handling and use.

Phase change compositions useful in building three-dimensional objects by selective deposition modeling must have an appropriate viscosity range at the temperature range at which jetting or deposition takes place, taking into account the particular ink jet print head used in the build apparatus. Such compositions must also have an appropriate melting point range and freezing point range within the temperature range used in the build process so as to expedite the build process while simultaneously avoiding the development of defects in the object being built.

There is a variety of challenges peculiar to building three-dimensional objects by selective deposition modeling. It is desirable to minimize or completely avoid each of these problems. Cohesive failure is one such problem. Cohesive failure is a break within the material itself after deposition and solidification. Adhesive failure is another concern. Adhesive failure is a break at the interface between different materials after deposition and solidification. Curl is a particularly vexing defect. Curl is the lifting of a deposited multi-layered object in the Z-direction, either during or after solidification, due to large differences in shrinkage stress transmitted from layer to layer of the deposited material. Typically, from about 10% to about 15% shrinkage can be observed in other selective deposition modeling compositions between the time of dispensing (dispensing or jetting temperature) and final formation of the multi-layered object (ambient or solid temperature). Such high shrinkage rates are unacceptable, since they result in severe defects in the formed object, including not only curl, but also stress cracks and delamination of object layers.

Stress cracking is fracturing of a multi-layered object in either the X-axis (Y-Z plane), or Y-axis (X-Z plane), during or after solidification, due to high shrinkage stress from layer to layer of the object, low cohesive strength of the material itself and/or the specific geometry of the object being built. Delamination is the separation of layers of an object in the Z-axis (X-Y plane) due to differences in the surface energy of deposited and solidified solid portions of the object and the surface tension of molten material being deposited onto those solid portions. Thermal meltdown, also known as thermal runaway, is yet another concern. Thermal runaway is the melting of deposited object layers into a puddle of liquid, which can result from a detrimentally low freezing point (solidification point) for the phase change composition.

The selective deposition modeling of three-dimensional objects has heretofore involved one or more of the above-described deficiencies to varying degrees. Phase change compositions used thus far in the selective deposition modeling of three-dimensional objects have proved lacking in terms of their optimal physical properties and the requisite toughness, hardness, elongation and lack of curl, crack and delamination of the finished objects. While a plethora of phase change compositions have been designed as hot melt ink compositions for two-dimensional printing, as disclosed for example in U.S. Pat. No. 4,889,560 to Jaeger, et al. issued Dec. 26, 1989, and U.S. Pat. No. 4,830,671 to Frihart et al. issued May 16, 1989, such compositions do not possess the requisite properties for successfully building three-dimensional objects by selective deposition modeling.

It is thus highly desirable and would be a significant advance in the art to develop phase change compositions that not only result in three-dimensional objects devoid of the above-described undesirable defects, but that also permit a significantly more rapid building of such objects than has heretofore been achieved.

Ranges and ratios may be combined and are by weight unless otherwise indicated. Temperatures are in degrees Celsius. unless otherwise indicated. All references to published information are herein incorporated by reference.

SUMMARY OF THE INVENTION

The present invention provides improved phase change compositions for selective deposition modeling techniques used in building three-dimensional objects. The present invention provides improved phase change compositions for use in selective deposition modeling techniques for building three-dimensional objects that facilitate the use of increased jetting and deposition rates for the compositions, coupled with rapid solidification of the compositions after jetting and deposition.

The present invention further provides improved compositions for use in selective deposition modeling techniques for building three-dimensional objects having higher freezing and melting temperatures that solidify quickly after deposition and are not subject to thermal meltdown. Still further, the present invention provides improved phase change compositions for use in selective deposition modeling techniques for building three-dimensional objects possessing minimal shrinkage characteristics.

The present invention additionally provides improved phase change compositions for use in building three-dimensional objects by selective deposition modeling techniques that result in three-dimensional objects that do not have undesired curl and stress cracks or are subject to delamination of the various layers of the objects. The present invention moreover provides improved phase change compositions for use in selective deposition modeling techniques that provide superior toughness, hardness and elongation properties in three-dimensional objects built from such compositions. The present invention yet further provides phase change compositions that result in three-dimensional objects formed by selective deposition modeling techniques that are not brittle, but rather are characterized by a superior elongation and ductility than hitherto known three-dimensional objects formed by such processes.

In a further aspect of the present invention, there are provided selective deposition modeling methods for building three-dimensional objects on a layer-by-layer basis that employ superior compositions as build materials for such objects.

A phase change composition of the present invention that is a solid at ambient temperature and a liquid at an elevated temperature above ambient temperature, adapted for use in selective deposition modeling to form a three-dimensional object, comprises a semi-crystalline mixture of polar and non-polar components, the semi-crystalline mixture having a freezing point of at least about 68° C., a melting point of at least about 88° C., and a viscosity of about 13 centipoise at about 135° C. As used in this specification in relation to the phase change compositions of the present invention, the term "ambient temperature" refers to typical room temperatures of about 20° C. to about 25° C.

The present invention also provides a phase change composition that is a solid at ambient temperature and a liquid at an elevated temperature above ambient temperature comprising a semi-crystalline mixture of components including a tetra-amide and a plurality of waxes, the plurality of waxes having a melting point range from about 85° C. to about 130° C. and a molecular weight range from about 150 to about 5000.

The wax components of the phase change composition are viscosity modifiers. The plurality of waxes possesses low viscosity, a broad melting point range, a broad molecular weight range and low shrinkage upon cooling. A particularly preferred melting point range for the plurality of waxes is from about 80° C. to about 110° C. and a preferred molecular weight range is from about 200 to about 3000. The waxes have melting points in the range selected from the group consisting of: 86° C. to 90° C., 91° C. to 94° C., or 90° C. to 97° C., and 104° C. to 116° C. In this regard, each wax has a melting point and a molecular weight that is different from each of the melting points and molecular weights of each of the remaining waxes. Each wax has a melting point and a molecular weight that falls within the specified range.

In yet another preferred aspect of the present invention, a phase change composition for selective deposition modeling of three-dimensional objects comprises a semi-crystalline mixture of components including a tetra-amide, a mono amide wax, at least one wax selected from the group consisting of petroleum waxes and synthetic waxes to minimize shrinkage of the formed object, and a first tackifier to increase toughness of the formed object. Preferably, the first tackifier is a modified rosin ester, and more particularly a tri-ester of hydrogenated abietic acid with glycerol.

In another preferred aspect of the present invention, there is provided a phase change composition for selective deposition modeling of three-dimensional objects comprising a semi-crystalline mixture of components including a tetra-amide, a first tackifier to increase toughness of the composition and a second tackifier to increase hardness of the composition. Preferably, the first tackifier is a modified rosin ester and the second tackifier is a hydrocarbon based aromatic resin.

The present invention further provides a phase change composition for use in selective deposition modeling of three-dimensional objects comprising a semi-crystalline mixture of components including a tetra-amide; a mono-amide wax; and at least one ester component for hydrogen-bonding with the tetra-amide and the mono-amide wax, thereby increasing the toughness of the composition. Preferably, the ester component comprises an ester tackifier and an ester plasticizer for increasing both the toughness and ductility of the composition.

In a particularly preferred embodiment of the present invention, a phase change composition for selective deposition modeling of three-dimensional objects comprises a semi-crystalline mixture of components including a tetra-amide, a mono-amide wax, a petroleum wax, a polyethylene wax, an ethylene-propylene copolymer wax, a modified rosin ester, a hydrocarbon based aromatic resin, an alkyl benzene phthalate, at least one antioxidant and at least one colorant.

In yet another aspect of the present invention, a selective deposition modeling method for forming a three-dimensional object on a layer-by-layer basis employs a phase change composition formulated in accordance with the present invention. The method comprises providing the phase change composition as a building material for a three-dimensional object; elevating the temperature of the building material to a temperature sufficient to cause the material to become fluid; selectively dispensing the material at the elevated temperature to form a layer of the material as a cross-section of the three-dimensional object, and lowering the temperature of the dispensed material to at least partially solidify the material.

In yet another aspect of the present invention, there is provided a method of making a phase change composition for use in the selective deposition modeling of three-dimensional objects.

DETAILED DESCRIPTION OF THE INVENTION

Selective deposition modeling compositions for forming three-dimensional objects in accordance with the present invention contain, in various preferred embodiments, an array of individual polar and non-polar crystalline and amorphous components that will now be described in detail. The various components are combined prior to use into a semi-crystalline phase change mixture having diverse properties that are important to the successful selective deposition modeling of three-dimensional objects. The semi-crystalline phase change mixture also is substantially homogeneous.

The tetra-amide component of the compositions of the present invention is a low molecular weight amorphous, polar polymer or oligomer that has a low viscosity to facilitate jettability during the object build process. Suitable tetra-amides for use in the present invention are disclosed, for example, in U.S. Pat. No. 4,830,671 to Frihart et al. issued May 16, 1989, U.S. Pat. No. 5,194,638 to Frihart et al. issued Mar. 16, 1993, U.S. Pat. No. 4,889,560 to Jaeger, et al. issued Dec. 26, 1989, and U.S. Pat. No. 5,645,632 to Pavlin issued Jul. 8, 1997, the contents of which are incorporated herein by reference.

Typical tetra-amides useful in the present invention, as disclosed for example in U.S. Pat. No. 4,830,671 to Frihart et al. issued May 16, 1989, are represented by the following formula:

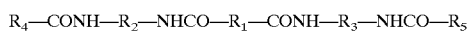

$R_4$—CONH—$R_2$—NHCO—$R_1$—CONH—$R_3$—NHCO—$R_5$ wherein $R_1$ is a polymerized fatty acid residue with 2 carboxylic acid groups removed; $R_2$ and $R_3$ are the same or different and each represents an alkylene with up to 12 carbon atoms, a cycloalkylene with 6 to 12 carbon atoms, an arylene with 6 to 12 carbon atoms, or an alkarylene with 7 to 12 carbon atoms; and $R_4$ and $R_5$ are the same or different and each represents an alkyl, a cycloalkyl, an aryl, or an alkaryl with up to 36 carbon atoms.

The tetra-amide typically has a molecular weight in the range of about 1294 to about 2162 and a viscosity of less than 250 centipoise at 150° C., typically 50 to 100 centipoise at 150° C. A particularly preferred tetra-amide for use in the present invention is available commercially from Union Camp Corporation under the designation X37-523-235, which has a viscosity of 52 centipoise at 150° C. and a softening point of about 128° C.

The tetra-amide is a low molecular weight resinous binder having four amide sites that provide the venue for hydrogen bonding with other components of the formulation, as will be described below, leading to enhanced toughness in the final formed object. The tetra-amide additionally has a low viscosity to enable jettability of the formulation at high temperatures. The tetra-amide component is present in the compositions of the present invention in amounts preferably ranging from about 5% to about 30% by weight of the total composition, more preferably ranging from about 10% to about 20% by weight, and most preferably in an amount of about 17.61% by weight.

The wax components of the compositions of the present invention function as viscosity modifiers and are characterized by low viscosity, a collective broad melting point range and low shrinkage. A preferred ratio of the combined weight percentages of the waxes to the weight percentage of the tetra-amide in the formulations of the present invention ranges from about 2:1 to about 6:1.

A first wax component of the compositions of the present invention is a mono-amide wax. The mono-amide wax component is a secondary amide resulting from the reaction of saturated and unsaturated fatty acids with saturated and unsaturated primary amines. A variety of compounds result, as exemplified by the known compounds stearyl erucamide, erucyl erucamide, oleyl palmitamide, stearyl stearamide and erucyl stearamide.

Suitable mono-amides for use in the present invention are known per se and are disclosed, for example, in U.S. Pat. No. 4,889,560 to Jaeger, et al. issued Dec. 26, 1989, and U.S. Pat. No. 5,372,852 to Titterington et al. issued Dec. 13, 1994, the contents of which are incorporated herein by reference. Typical mono-amides useful in the present invention, as disclosed for example in U.S. Pat. No. 4,889,560 to Jaeger, et al. issued Dec. 26, 1989, are represented by the following formula:

$C_XH_Y$—CONH—$C_AH_B$ wherein X is an integer from 5 to 21; Y is an integer from 11 to 43; A is an integer from 6 to 22; and B is an integer from 13 to 45.

The mono-amide typically has a molecular weight in the range of about 199 to 647 and a viscosity ranging from about 1 to about 15 centipoise at 135° C. A particularly preferred mono-amide for use in the present invention is stearyl stearamide, available commercially, for example, from Witco Corporation under the designation Kemamide S-180. Kemamide S-180 has a viscosity of about 5.9 centipoise at 135° C. and a melting point ranging from about 92° C. to about 95° C.

The hydrocarbon, stearyl groups at each end of the secondary mono-amide provide it with a crystalline, waxy nature. The short carton chain length gives the mono-amide a desired low melt viscosity. Nevertheless, the mono-amide is sufficiently non-polar to solubilize waxy, hydrocarbon components in the formulation. The secondary amide group at the core provides the requisite polarity to make it compatible with polar compounds in the formulation, for example, the tetra-amide and, as will be described below, the ester tackifier and ester plasticizer. The amide group in the secondary mono-amide increases the melting point, which helps the formulation in terms of providing a higher freezing point, which in turn results in quick solidification of the formulation after dispensing. Finally, the amide site of the mono-amide also provides the venue for hydrogen bonding with other components of the formulation, as will be described below, leading to enhanced toughness in the final object formed.

Overall, then, the mono-amide is a polar component of the formulation of the present invention acts as a viscosity modifier for the formulation and a co-solubilizer of polar and non-polar components in the formulation, while possessing both a desirably high and sharp melting point and low viscosity. That is, the mono-amide has sufficient non-polar hydrocarbon properties to solubilize non-polar materials even though it is classed as a polar compound.

The mono-amide component is present in the compositions of the present invention in amounts preferably ranging from about 15% to about 40% by weight of the total composition, more preferably from about 20% to about 30% by weight, and most preferably in an amount of about 26.91% by weight. A preferred ratio of the weight percentage of the mono-amide to the weight percentage of the tetra-amide in the formulations of the present invention ranges from about 4:1 to about 1:1.

A second wax component of the compositions of the present invention is a petroleum wax. Petroleum waxes are a class of petroleum waxes that are produced in known manner by the solvent recrystallization of selected petroleum fractions into materials consisting of n-paraffinic, branched paraffinic and naphthenic hydrocarbons in the $C_{30}$ to $C_{60}$ range.

Petroleum waxes suitable for use in the present invention are known. They typically have molecular weights ranging from about 422 to about 842 and melting points ranging from about 88° C. to about 96° C. A particularly preferred petroleum wax for use in the present invention is available commercially from Baker Petrolite Corporation under the designation C-700, has a melting point of about 93° C. and has a viscosity of about 8.6 centipoise at 135° C.

The petroleum wax component is present in the compositions of the present invention in amounts preferably ranging from about 5% to about 25% by weight of the total composition, more preferably from about 10% to about 20% by weight, and most preferably in an amount of about 16.63% by weight. The petroleum wax has the dual functions of increasing the hardness and reducing the shrinkage of the final formulation.

A third wax component of the compositions of the present invention is a polyethylene wax. Such synthetic waxes are known per se, belong to the family of fully saturated crystalline homopolymers of ethylene, and are characterized by unusually narrow melt distribution, low melt viscosities and extreme hardness at elevated temperatures. They exhibit outstanding heat stability and resistance to chemical attack due to being fully saturated.

Polyethylene waxes suitable for use in the present invention typically have molecular weights ranging from about 500 to about 3000 and melting points ranging from about 80° C. to about 129° C. A particularly preferred polyethylene wax for use in the present invention is available commercially from Baker Petrolite Corporation under the designation PEW 500, or Polywax 500. which has a melting point of about 88° C. and a viscosity of about 4.1 centipoise at 135° C.

The polyethylene wax component is preferably present in the compositions of the present invention in amounts ranging up to about 15% by weight of the total composition, conveniently from about 3% to about 10% by weight, preferably about 4% to about 9%, and most preferably in an amount of about 5.87% by weight. A preferred ratio of the weight percentage of the petroleum wax to the weight percentage of the polyethylene wax in the formulations of the present invention ranges from about 3:1 to about 1:1. The hard polyethylene wax is used in the formulation of the present invention because of its outstanding thermal stability, high hardness and high melting point.

A fourth wax component of the compositions of the present invention is a synthetic branched wax. Particularly useful synthetic branched waxes for use in the present invention include synthetic microcrystalline analogs of polywax, such as ethylene-propylene copolymers, which are more consistent and reproducible than the petroleum derived waxes. Such waxes exhibit desirable flexibility at low temperatures.

Ethylene-propylene copolymer waxes suitable for use in the present invention typically have molecular weights ranging from about 650 to about 1200 and melting points ranging from about 96° C. to about 112° C. A particularly preferred ethylene-propylene copolymer wax for use in the present invention is available commercially from Baker Petrolite Corporation under the designation EP 1100 which has a melting point of about 110° C. and a viscosity of about 17.6 centipoise at 135° C.

The synthetic branched wax component is preferably present in the compositions of the present invention in amounts ranging up to about 10% by weight of the total composition preferably about 1% to about 6% by weight, more preferably from about 2% to about 5% by weight, and most preferably in an amount of about 2.94% by weight. A preferred ratio of the weight percentage of the polyethylene wax to the weight percentage of the synthetic branched wax in the formulations of the present invention ranges from about 3:1 to about 1:1. The synthetic branched wax is used in the formulation of the present invention because of its high melting point and low temperature flexibility. The branching from, for example, the propylene group in the ethylene-propylene copolymer wax helps minimize shrinkage of the formulation.

Optionally, the formulations of the present invention may include an ester wax in amounts typically up to about 10% by weight of the total composition, and more preferably in amounts of about 1% to about to about 5% by weight, more preferably about 1.5% to 4.5% by weight. A particularly preferred ester wax for use in the present invention is available commercially from Floechst Corporation under the designation Wax E. Wax E is an ester wax derived from Montan wax and has a molecular weight range of from about 730 to about 750, a viscosity of 14.5 centipoise at 130° C. and a melting point of about 77.34° C. The ester wax increases the hardness of the formulations of the present invention. In this regard, the ester wax provides a synergistic effect on the hydrogen bonding that occurs in the formulation, as will be discussed in more detail below, and also favorably affects the formulation's heat stability.

Each wax in the formulations of the present invention has a different melting point than each of the remaining waxes in the formulation. The distribution of melting points of the various waxes in the compositions of the present invention provides a formulation having a large temperature transition from a liquid to a solid state after deposition, which minimizes shrinkage in the deposited material. This broad transition gives the deposited material time to relax and minimizes internal stresses which build up due to shrinkage of the material during cooling, which stresses would be much greater if the material solidified quickly at or about a single temperature.

The first tackifier component of the compositions of the present invention is a modified rosin ester. Such rosin esters are highly purified for use where extremely low metallic content is needed, as well as low odor, taste and water white color. Particularly useful rosin esters for use in the present invention include trimesters of hydrogenated abietic acid with glycerol, which are known per se, as disclosed in U.S. Pat. No. 4,889,560 to Jaeger, et al. issued Dec. 26, 1989 and U.S. Pat. No. 5,372,852 to Titterington et al. issued Dec. 13, 1994, the contents of which are incorporated herein by reference.

A particularly preferred tri-ester tackifier for use in the present invention is available commercially from Arakawa Chemical, Inc. under the designation KE-100. KE-100 has a molecular weight of about 962, a softening point of about 102.97° C.±0.88° C., a softening point range from about 66° C. to about 110° C. and a viscosity in a 50/50 mixture with the mono-amide wax component of about 15.2 centipoise at 135° C. The first tackifier component is present in the compositions of the present invention in amounts conveniently ranging from about 10% to about 40% by weight of the total composition, more preferably about 12% to about 35% by weight, even more preferably from about 15% to about 30% by weight, and most preferably in an amount of about 16.63% by weight. A preferred ratio of the weight percentage of the ester tackifier to the weight percentage of the tetra-amide in the formulations of the present invention ranges from about 0.5:1 to about 5:1. A preferred ratio of the combined weight percentages of the tetra-amide and the mono-amide wax to the weight percentage of the ester tackifier in the formulations of the present invention ranges from about 1:1 to about 3:1.

The ester tackifier interacts with both the tetra-amide and the mono-amide wax to synergistically increase the toughness of the final formed object. In this regard, an intermolecular attraction between the unsaturated oxygen atoms of the (polar) ester tackifier and the hydrogen atoms at the amide sites of the tetra-amide and the mono-amide wax, generally known in the chemical field as hydrogen bonding, provides this synergistic increase in toughness.

A second tackifier component of the compositions of the present invention is a hydrogenated hydrocarbon based aromatic resin. The non-polar hydrocarbon hydrogenated based aromatic resin is compatible with the waxes in the formulation and increases the hardness of the formulation. The increased hardness decreases cohesive and adhesive failure between the material of the formed object and the material of the support structures for the object, which in turn facilitates subsequent removal of the support structures from the final formed object.

Hydrocarbon based aromatic resins suitable for use in the present invention are manufactured in known manner by the selective partial hydrogenation of based resins that have been polymerized from mixed aromatic monomer feed streams. They typically have molecular weights in the range of from about 700 to about 1300 and softening points in the range from about 90° C. to about 125° C. A particularly preferred hydrocarbon based aromatic resin for use in the present invention is available commercially from Hercules under the designation Regalite R101. Regalite R101 has a molecular weight of about 850, a softening point of about 99° C. and a viscosity in a 50/50 mixture with the mono-amide wax component of about 17.8 centipoise at 135° C.

The hydrocarbon based aromatic resin is preferably present in the compositions of the present invention in amounts ranging up to about 15% by weight of the total composition, more preferably from about 5% to about 12% by weight, and most preferably in an amount of about 9.1% by weight. A preferred ratio of the combined weight percentages of the hydrocarbon waxes to the weight percentage of the hydrocarbon based tackifier in the formulations of the present invention ranges from about 2:1 to about 3:1. In this regard, the hydrocarbon waxes include the petroleum wax, the polyethylene wax, the synthetic branched wax and the ester wax, but do not include the mono-amide wax.

The second tackifier is used in the formulation of the present invention to increase the hardness of the formulation. This facilitates removal of the various support structures from the surfaces of the final formed object.

The plasticizer component of the compositions of the present invention is a polar compound chosen to help increase elongation and decrease the modulus of elasticity, thus decreasing brittleness and correspondingly increasing flexibility of the final formed object. Benzyl phthalates, and preferably alkyl benzene phthalates (such as mixed esters), have been found to be particularly suitable for these purposes.

A particularly preferred plasticizer for use in the present invention is available commercially from Monsanto under the designation Santicizer 278. Santicizer 278 is a liquid high molecular weight benzyl phthalate possessing low volatility, excellent permanence and aggressive solvating characteristics, with a molecular weight of about 455 and a viscosity of about 5.2 centipoise at 135° C. The plasticizer is present in the compositions of the present invention in amounts preferably ranging up to about 10% by weight of the total composition, more preferably from about 2% to about 6% by weight, and most preferably in an amount of about 3.91% by weight. A preferred ratio of the weight percentage of amide (tetra-amide plus mono-amide wax) to the weight percentage of ester (ester tackifier plus ester plasticizer) in the formulations of the present invention ranges from about 0.75:1 to about 2.5:1.

The plasticizer is used in the formulation of the present invention to increase the elongation and decrease the modulus of elasticity of the final formed object. An elongation of up to about 73%, advantageously ranging from about 14% to about 200%, is achievable using the formulations of the present invention. This decreases brittleness of the final formed object, providing an object that is more ductile than heretofore known in the art. This increased ductility facilitates part handling of thin wall features of the final formed object and provides an object less subject to curl, crack and delamination. The ester plasticizer also provides additional ester sites for hydrogen bonding with the amide sites of the tetra-amide and the mono-amide wax, thus favorably influencing the toughness of the formulation.

The compositions of the present invention preferably include at least one antioxidant. A primary antioxidant can be used in the formulations of the present invention as a free radical scavenger. A secondary antioxidant can be used in the formulations of the present invention as an alkyl hydroperoxide scavenger.

The primary and secondary antioxidants are each present in the formulation in amounts preferably less than about 1% by weight of the total formulation and, most preferably in amounts of about 0.2% by weight. A particularly preferred free radical scavenger antioxidant for use in the present invention is available commercially from Uniroyal Chemical Co., Inc. under the designation Naugard 524. A particularly preferred alkyl hydroperoxide scavenger antioxidant for use in the present invention is 4,4'-bis(alpha, alpha-dimethylbenzyl)diphenylamine, available commercially from Uniroyal Chemical Co., Inc. under the designation Naugard 445. Naugard 445 has a molecular weight of about 405 and a melting point of about 98° C. to about 100° C.

The formulations of the present invention optionally include at least one colorant. In this regard, the colorant is preferably a solvent dye. Virtually any acid dye, dispersed dye, or solvent dye or combination thereof may be employed in the compositions of the present invention. A particularly preferred solvent dye is available commercially from Clariant Corporation under the designation Savinyl Black RLS, which is a trivalent chromium complex of an azo dye known as C.I. Solvent Black 45.

The colorant can be present in the formulation in any desired amount. However, an excessive amount of colorant in the formulation reduces filtration efficiency not only during the formulation manufacturing process, but also during jetting from the print head during object building. Accordingly, the colorant is preferably present in an amount no greater than about 2% by weight of the total composition, more preferably in an amount no greater than about 1% by weight. and most preferably in an amount of about 0.09% by weight. As little as about 0.001% by weight of colorant may be used in the formulations of the present invention. In this regard, large quantities of colorant are not needed in the formulations of the present invention to effectively color the object built.

The phase change compositions of the present invention possess many advantages in comparison to phase change compositions used heretofore in the selective deposition modeling of three-dimensional objects. The increased freezing point of the formulation, at least 68° C., increases the temperature delta or differential between ambient temperature and the freezing point in comparison to the most advanced known formulations, which possess freezing points of about 56° C. This increased temperature differential allows the deposited liquid material to solidify more quickly after deposition than previously possible. The increase in solidification rate permits the use of significantly faster deposition rates of the molten material during the build process than hitherto achievable. As a consequence, three-dimensional objects can now be built much more quickly using selective deposition modeling methods by employing a significantly faster build speed coupled with a substantially quicker solidification of the deposited melted material.

The decreased viscosity of the formulation, of less than 18 centipoise, and preferably about 13 centipoise at 135° C., allows for optimum jetting performance using preferred ink jet print heads, which are designed for optimum performance when used in conjunction with phase change materials having a viscosity of 13 centipoise at 135° C.

The formulations of the present invention are characterized by superior thermal stability in relation to known formulations. The compositions of the present invention demonstrate a viscosity increase of only 18% after being thermally aged for 28 days at 140° C., in comparison to known three-dimensional modeling compositions, which are characterized by viscosity increases of up to 48.1% under similar conditions.

The combination of waxes defining broad molecular weight and melting point ranges provides a formulation with lower shrinkage, which results in three-dimensional objects having reduced curl. In a particularly preferred embodiment, curl is optimally reduced-by formulating the phase change composition with a combination of four waxes. Each wax has a different melting point within the range from about 88° C. to about 110° C. and a different molecular weight within the range from about 200 to about 3000.

The combination of amide and ester components in the formulations of the present invention leads to enhanced toughness in the finished three-dimensional objects over that obtained by previous selective deposition modeling methods for building three-dimensional objects. Thus, the intermolecular attraction between the amides of the formulation, i.e., the tetra-amide and the mono-amide wax, and the esters of the formulation, i.e., the rosin ester tackifier and/or the ester plasticizer, results largely from hydrogen bonding between these components, which results in a tougher final product than heretofore known.

The formulations of the present invention are also characterized by superior ductility in relation to known formulations. The compositions of the present invention demonstrate an advantageous Elongation ranging from at least about 14% to about 73% and a Flex Modulus that result in an extremely flexible material that is less brittle, and less subject to curl, stress crack and delamination, than other materials. In turn, ease of removal of the support structures from the finished three-dimensional object is enhanced and simplified.

The phase change compositions of the present invention can be used to build superior three-dimensional objects. In this regard, the compositions of the present invention are especially suitable for building three-dimensional objects of substantial size, e.g., objects having a minimum height of at least 1 cm., measured in the Z-direction.

EXAMPLE 1

A formulation is made in accordance with the present invention by mixing the individual components in a kettle equipped with a mixing blade and preheated to 115° C. The mixture is heated at 115° C. after the addition of each component with moderate stirring, for example at 5 RPM, until a homogenized, molten state is achieved. The next component is then added and the heating and melting steps repeated.

TABLE 1

| Component | Melting Pt. (° C.) | Weight % |
|---|---|---|
| PEW 500 | 88 | 5.87 |
| C 700 | 96 | 16.63 |
| Naugard 445 | 99 | 0.2 |
| X37-523-235 | 128 | 17.61 |
| Naugard 524 | — | 0.2 |
| Santicizer 278 | Liquid | 3.91 |
| KE-100 | 66.73 | 16.63 |
| Regalite R101 | 100 | 9.1 |
| EP 1100 | 110.46 | 2.94 |
| Kemamide S-180 | 93.7 | 26.91 |

After components are mixed and melted, the formulation is heated further for 1 hour at 115° C. with mixing at 60 RPM, followed by mixing at 10 RPM, until a uniform liquid is obtained. The formulation is then tested for viscosity, after which 0.09 weight % of a colorant, Savinyl RLS Black, is added. The formulation is mixed again at 60 RPM for 1 hour at 115° C. The final homogeneous formulation is then tested again to assure a final desired viscosity.

The above formulation has the physical properties shown in the following Table 2:

TABLE 2

| | |
|---|---|
| Jetting Temperature (° C.) | 135° C. |
| Viscosity (Centipoise) | 13.0 ± 0.3 at 135° C. |
| Hardness (Shore D) | 45 |
| Elongation (% E) | 73 |
| Flex Modulus (MPa) | 230 |
| Surface Tension (dyne/cm) | 32 |
| Density (g/ml) | 0.86 |
| Melting Point (° C.) | 88° C. |

TABLE 2-continued

| Freezing Point (° C.) | 68° C. |
|---|---|
| Work (in-lb/in³) | 12 |
| Stress Yield (MPa) | 3 |

EXAMPLES 2 TO 7

A variety of formulations are made in accordance with the present invention in the same manner as set forth in Example 1. The compositions are formulated as shown in the following Table 3, wherein amounts of each component of the formulation are indicated as percentages by weight of the total formulation:

TABLE 3

| Component | Ex. 2 | Ex. 3 | Ex. 4 | Ex. 5 | Ex. 6 | Ex. 7 |
|---|---|---|---|---|---|---|
| Kemamide S180 | 25.5 | 30.8 | 25.5 | 25.8 | 23 | 26 |
| C700 | 17 | 9 | 17 | 17 | 17 | 21 |
| PEW500 | 6 | 6 | 6 | 6 | 9 | 0 |
| EP1100 | 3 | 3 | 3 | 3 | 0 | 2 |
| Wax E | 0 | 0 | 0 | 0 | 0 | 5 |
| Santicizer 278 | 4 | 6 | 4 | 4 | 4.8 | 4.5 |
| KE100 | 17 | 36 | 27.3 | 23 | 23 | 21.3 |
| Regalite R101 | 9.3 | 0 | 0 | 0 | 0 | 0 |
| X-37-523-235 | 18 | 9 | 17 | 21 | 23 | 20 |
| N524 | 0.2 | 0.2 | 0.2 | 0.2 | 0.2 | 0.2 |

Three-dimensional objects are made using a selective deposition modeling method employing the formulations of Examples 2 to 7. The formulations are selectively deposited onto the building platform of a three-dimensional modeling system layer-by-layer using an ink jet print head manufactured by Tektronix, Inc. designed for optimum jetting performance for phase change compositions having a viscosity of 13 centipoise at 135° C. The materials are very tough, flexible and not subject to thermal meltdown during the high temperature build process, as demonstrated by tests conducted to measure various critical properties of the formulations and objects built using those formulations.

Hardness of the three-dimensional object is measured using the ASTM D2240-95 (Shore D) standard test for measuring durometer hardness. This test measures penetration into the object by a specific type of indentor, PTS instrument Model 409. Toughness of the three-dimensional object is defined as the integration of the area under the stress strain curve for the material (Work) and is measured, along with Stress Yield (MPa) and Elongation (%), using the ASTM D638-87a standard test for measuring tensile properties. The Flex Modulus of the three-dimensional object is measured using the ASTM D790-97 standard test for flexural properties (MPa).

Physical properties of the formulations. as well as the physical properties of three-dimensional objects made therefrom, are indicated in the following Table 4:

TABLE 4

| Physical Property | Ex. 2 | Ex. 3 | Ex. 4 | Ex. 5 | Ex. 6 | Ex. 7 |
|---|---|---|---|---|---|---|
| Viscosity @ 135° C. | 12.9 | 12.9 | 13 | 13.4 | 13.2 | 13.3 |
| Hardness (Shore D) | 45 | 46 | 45 | 44 | 43 | 43 |
| Melting Point (° C.) | 90 | 88 | 89 | 91 | 91 | 91 |
| Freezing Point (° C.) | 69 | 69 | 68 | 68 | 71 | 71 |
| Work (in-lb/in³) | 11.8 | 12 | 13.5 | 9.8 | 2.9 | 5.2 |
| % Elongation | 14 | 73 | 23 | 9 | 3 | 4 |
| Stress Yield (MPa) | 3 | 2.2 | 3 | 3 | 2.8 | 3.8 |
| Flex Modulus (MPa) | 218 | 185 | 222 | ** | 230 | ** |
| Qualitative Result | Tough | Hard | Tough | Tough | Tough | Tough |

COMPARATIVE EXAMPLE

A hot melt ink composition disclosed in U.S. Pat. No. 4,889,560 to Jaeger, et al. issued Dec. 26, 1989 for two-dimensional printing is formulated with a tetra-amide, a mono-amide, a tackifier, a plasticizer and an antioxidant. The composition is formulated as shown in the following Table 5, wherein amounts of each component are indicated as percentages by weight of the total formulation:

TABLE 5

| Component | Weight % |
|---|---|
| Kemamide S-180 | 48 |
| X-37-523-235 | 20.8 |
| KE-100 | 23 |
| Santicizer 278 | 8 |
| N-524 | 0.2 |

The composition is employed to make a three-dimensional object by selective deposition modeling, in the same manner as the formulations of Examples 2 to 7. The properties of the composition, measured in the same manner as in Examples 2 to 7, are enumerated in the following Table 6:

TABLE 6

| Jetting Temperature (° C.) | 135° C. |
|---|---|
| Viscosity (Centipoise) | 13 at 135° C. |
| Hardness (Shore D) | 37 |
| Melting Point (° C.) | 91 |
| Freezing Point (° C.) | 71 |
| Work (in-lb/in³) | 3.8 |
| % Elongation | 6 |
| Stress Yield (MPa) | 2 |
| Surface Tension (dyne/cm) | 29.53 |
| Density (g/ml) | 0.85 |
| Flex Modulus (MPa) | 176 |

Three-dimensional objects manufactured using the phase change ink of the Comparative Example and using the phase change formulations of Examples 2 to 7 according to the present invention are subjected to process evaluation at a room temperature of 260 C. to determine curl, crack and delamination characteristics. The results of the process evaluation are indicated in the following Table 7:

TABLE 7

|  | C. Ex. | Ex. 2 | Ex. 3 | Ex. 4 | Ex. 5 | Ex. 6 | Ex. 7 |
| --- | --- | --- | --- | --- | --- | --- | --- |
| Left Curl (mm) | 2.7 | 1.5 | 1.5 | 1.5 | 2 | 2 | 2.5 |
| Right Curl (mm) | 2.7 | 1.5 | 1.5 | 1.5 | 2 | 2 | 2.5 |
| Crack (mil) | 50 | 50 | None | None | None | None | None |
| Delamination (MLS) | 14 | 20 | 23 | 18 | 18 | 16 | 18 |
| Support Removal | Average | Easy | Easy | Easy | Easy | Easy | Gummy |
| Thermal Runaway | 13,13,8 | 13,13,9 | 13,13,8 | 13,13,9 | 13,13,8 | 13,13,9 | 13,13,9 |

Curl is determined by building a set of four bars of 252×6 mm with increasing thickness of 1, 2, 4, and 8 mm. Each of Examples 2 to 7 and the Comparative Example is built using an Actua 2100 Concept Modeler, a three-dimensional modeling apparatus available from 3D Systems, Inc. of Valencia, Calif. The amount by which the left and right ends of each block raise up off the build platform 24 hours after the build is completed is then measured. The block is also examined at this time for any cohesive or adhesive failure, including failure at the interface between the build platform and the block, failure within the support structures for the object, and failure at the solid interface between the object and the support structures for the object.

It will be observed from Table 7 that all formulations of the present invention result in three-dimensional objects characterized by reduced curl (as little as 1.5 mm) in relation to three-dimensional objects built attempting to use a two-dimensional printing phase change compositions, i.e., using the formulation of the Comparative Example (left and right curl of 2.7 mm). This is a significant advance in the selective deposition modeling production of desirable three-dimensional objects.

Additionally, three-dimensional objects built using the formulations of the present invention are generally notable for their absence of stress cracks. Three crack diagnostic bars of 50 mil (1.27 mm), 75 mil (1.91 mm) and 100 mil (2.54 mm) of varying widths are built using an Actua 2100 Concept Modeler for each of the formulations of Examples 2 to 7 and the Comparative Example. Each bar is examined for cracks immediately after the build and 24 hours after completion of the build. A measurement of "none" indicates that no cracks are observed in any of the three bars. A measurement of "50" indicates that cracks are observed in the 50 mil (1.27 mm) bar, but not in the other bars. As can be seen from Table 7, the tested formulations of the present invention generally result in bars of 50 mil (1.27 mm), 75 mil (1.91 mm) and 100 mil (2.54 mm) having no observable cracks at all, while the 50 mil (1.27 mm) bar of the Comparative Example cracks.

The formulations of the present invention also result in support structures that are not characterized by cohesive failure. A fractal support is used to evaluate the ease of support removal, 30 minutes after the object build is complete. The strong cohesiveness of the support structures results in their easy and complete removal after the build process from the three-dimensional objects they support during the build process. Removal of the support structures from the three-dimensional object of the Comparative Example is problematic and typical of the difficulty of cleanly and easily removing support structures experienced in using a two-dimensional ink formulation for three dimensional modeling.

The formulations of Examples 2 to 7 and the Comparative Example are also tested for thermal runaway. A thermal test block of each formulation is built using an Actua 2100 Concept Modeler to a size of 3×1.25×1 inch (7.62×3.18×2.54 cm) with square holes that run vertically through the block. Thirteen approximately 0.254 mm holes are built into the left portion of the block, thirteen approximately 0.254 mm holes are built into the right portion of the block, and nine holes of various sizes ranging from about 0.254 mm to about 2.3 mm are built into the central portion of the block. The reported data indicates the number of holes on the left, right and middle, respectively, that are built successfully on each block. A hole is successfully built if light passes through it. It will be seen from the results shown in Table 7 that the formulations of Examples 2, 4, 6 and 7 resulted in blocks in which all the holes were successfully built (13, 13, 9). Conversely, the formulation of the Comparative Example resulted in a block with a hole in the central portion that had deteriorated due to thermal meltdown (13, 13, 8).

Finally, the formulations of the present invention result in three-dimensional objects not subject to delamination. A minimum layer second (MLS) test is used to visually evaluate delamination of a 3×1.25×1 inch (7.62×3.18×2.54 cm) thermal diagnostic block built with a single pass build style (single layer thickness of about 0.0015 mil) (3.8×10−3 cm) using an Actua 2100 Concept Modeler. Under such conditions, an MLS of at least 16 is necessary to insure that delamination will not occur. As can be seen from Table 7. the formulations of the present invention all had MLS values of at least 16, whereas the formulation of the Comparative Example had an MLS value of 14, which is insufficient to prevent delamination and typical of a two-dimensional ink formulation.

While the present invention has been disclosed and described with respect to particular and preferred embodiments, various modifications and alternatives will be apparent and will suggest themselves to those or ordinary skill in the art. Such modifications and alternatives do not depart from and are within the spirit and scope of the present invention, which is only to be limited as set forth in the appended claims.

What is claimed is:

1. A phase change composition that is a solid at ambient temperature and a liquid at an elevated temperature above ambient temperature, adapted for use in selective deposition modeling to form a three-dimensional object, comprising a semi-crystalline mixture of polar and non-polar components, the semi-crystalline mixture having a freezing point of at least about 68° C., a melting point of at least about 88° C., and a viscosity of about 13 centipoise at 135° C.

2. The phase change composition according to claim 1, having a freezing point in the range of about 68° C. to about 71° C. and a melting point in the range of about 88° C. to about 90° C.

3. The phase change composition according to claim 1, having an elongation of at least about 14%.

4. The phase change composition according to claim 3, having an elongation in the range of about 14% to about 73%.

5. The phase change composition according to claim 1, wherein there are at least two waxes present which have melting points in the range selected from the group consisting of: 86° C. to 90° C., 91° C. to 94° C., or 90° C. to 97° C., and 104° C. to 116° C.

6. The phase change composition according to claim 1, wherein there are at least three waxes present which have melting points in the range selected from the group consisting of: 86° C. to 90° C., 91° C. to 94° C., 90° C. to 97° C., and 104° C. to 116° C.

7. The phase change composition according to claim 1, wherein there are four waxes present and the melt points of the waxes are in the ranges of 86° C. to 90° C., and 91° C. to 94° C., and 90° C. to 97° C., and 104° C. to 116° C.

8. A phase change composition that is a solid at ambient temperature and a liquid at an elevated temperature above ambient temperature, adapted for use in selective deposition modeling to form a three-dimensional object, comprising a semi-crystalline mixture of components including a tetra-amide and a plurality of waxes, wherein each wax of the plurality of waxes has a different melting point than each other wax in the plurality of waxes, and each wax has a melting point within the range from about 80° C. to about 135° C.

9. The phase change composition according to claim 8, wherein each wax of the plurality of waxes has a different melting point within the range from about 85° C. to about 130° C.

10. The phase change composition according to claim 9, wherein the synthetic wax is selected from the group consisting of polyethylene wax and synthetic branched wax.

11. The phase change composition according to claim 10, wherein the synthetic branched wax is an ethylene-propylene copolymer wax.

12. The phase change composition according to claim 8, wherein the ratio of the combined weight percentages of the plurality of waxes to the weight percentage of the tetra-amide in the composition ranges from about 2:1 to about 6:1.

13. The phase change composition according to claim 8, wherein each wax of the plurality of waxes has a different molecular weight than each other wax of the plurality of waxes, and each wax has a molecular weight within the range from about 150 to about 5000.

14. The phase change composition according to claim 8, wherein each wax of the plurality of waxes is selected from the group consisting of mono-amide wax, petroleum wax and synthetic wax.

15. The phase change composition according to claim 8, wherein there are at least two waxes in the plurality of waxes which have melting points in the range of 86° C. to 90° C., and 91° C. to 94° C., and 90° C. to 97° C., and 104° C. to 116° C.

16. The phase change composition according to claim 8, wherein there are at least three waxes in the plurality of waxes which have melting points in the range of 86° C. to 90° C., and 91° C. to 94° C., and 90° C. to 97° C., and 104° C. to 116° C.

17. The phase change composition according to claim 8, wherein there are at least four waxes in the plurality of waxes and the melt points of the waxes are in the ranges of 86° C. to 90° C., and 91° C. to 94° C., and 90° C. to 97° C., and 104° C. to 116° C.

18. A phase change composition that is a solid at ambient temperature and a liquid at an elevated temperature above ambient temperature, adapted for use in selective deposition modeling to form a three-dimensional object, comprising a semi-crystalline mixture of components including a tetra-amide, a mono-amide wax, at least one wax selected from the group consisting of petroleum waxes and synthetic waxes, and an ester tackifier.

19. The phase change composition according to claim 18, wherein the ester tackifier is a modified rosin ester.

20. The phase change composition according to claim 19, wherein the modified rosin ester is a glycerol tri-ester of hydrogenated abietic acid.

21. The phase change composition according to claim 18, wherein the ratio of the weight percentage of the ester tackifier to the weight percentage of the tetra-amide in the composition ranges from about 0.5:1 to about 5:1.

22. The phase change composition according to claim 18, wherein the ratio of the combined weight percentages of the tetra-amide and the mono-amide wax to the weight percentage of the ester tackifier in the composition ranges from about 1:1 to about 3:1.

23. The phase change composition according to claim 18, wherein there are four waxes present and the melt points of the waxes are in the ranges of 86° C. to 90° C., and 91° C. to 94° C., and 90° C. to 97° C., and 104° C. to 116° C.

24. A phase change composition that is a solid at ambient temperature and a liquid at an elevated temperature above ambient temperature, adapted for use in selective deposition modeling to form a three-dimensional object, comprising a semi-crystalline mixture of components including a tetra-amide, an ester tackifier and a hydrocarbon resin tackifier.

25. The phase change composition according to claim 24, wherein the ester tackifier is a modified rosin ester and the hydrocarbon resin tackifier is a hydrocarbon based aromatic resin.

26. The phase change composition according to claim 25, wherein the modified rosin ester is a glycerol tri-ester of hydrogenated abietic acid.

27. The phase change composition according to claim 24, wherein the ratio of the weight percentage of the ester tackifier to the weight percentage of the tetra-amide in the composition ranges from about 0.5:1 to about 5:1.

28. The phase change composition according to claim 24, further comprising a plurality of waxes wherein at least two waxes in the plurality of waxes have melting points in the range of 86° C. to 90° C., and 91° C. to 94° C., and 90° C. to 97° C., and 104° C. to 116° C.

29. The phase change composition according to claim 24, wherein there are at least three waxes in the plurality of waxes which have melting points in the range of 86° C. to 90° C., and 91° C. to 94° C., and 90° C. to 97° C., and 104° C. to 116° C.

30. The phase change composition according to claim 24, wherein there are four waxes in the plurality of waxes and the melt points of the waxes are in the ranges of 86° C. to 90° C., and 91° C. to 94° C., and 90° C. to 97° C., and 104° C. to 116° C.

31. A phase change composition that is a solid at ambient temperature and a liquid at an elevated temperature above ambient temperature, adapted for use in selective deposition modeling to form a three-dimensional object, comprising a semi-crystalline mixture of components including a tetra-amide, a mono-amide wax and at least one ester component for hydrogen-bonding with the tetra-amide and the mono-amide wax.

32. The phase change composition according to claim 31, wherein the at least one ester component is selected from the group consisting of ester tackifiers and ester plasticizers.

33. The phase change composition according to claim 32, wherein the ester tackifier is a modified rosin ester.

34. The phase change composition according to claim 33, wherein the modified rosin ester is a glycerol tri-ester of hydrogenaced abietic acid.

35. The phase change composition according to claim 31, wherein the ester plasticizer is an alkyl benzene phthalate.

36. The phase change composition according to claim 35, wherein the ester component comprises an ester tackifier and an ester plasticizer.

37. The phase change composition according to claim 36, wherein the ester tackifier is a modified rosin ester and the ester plasticizer is an alkyl benzene phthalate.

38. The phase change composition according to claim 37, wherein the modified rosin ester is a glycerol tri-ester of hydrogenated abietic acid.

39. The phase change composition according to claim 31, wherein the ratio of the combined weight percentages of the tetra-amide and the mono-amide wax to the weight percentage of the ester component in the composition ranges from about 0.75:1 to about 2.5:1.

40. The phase change composition according to claim 31, wherein the ratio of the combined weight percentages of the tetra-amide and the mono-amide wax to the weight percentage of the ester tackifier in the composition ranges from about 1:1 to about 3:1.

41. The phase change composition according to claim 31, wherein there are at least two waxes present which have melting points in the range of 86° C. to 90° C., and 91° C. to 94° C., and 90° C. to 94° C., and 104° C. to 116° C.

42. The phase change composition according to claim 31, wherein there are at least three waxes present which have melting points in the range of 86° C. to 90° C., and 91° C. to 94° C., and 90° C. to 97° C., and 104° C. to 116° C.

43. The phase change composition according to claim 31, wherein there are four waxes in the plurality of waxes and the melt points of the waxes are in the ranges of 86° C. to 90° C., and 91° C. to 94° C., and 90° C. to 97° C., and 104° C. to 116° C.

44. A phase change composition that is a solid at ambient temperature and a liquid at an elevated temperature above ambient temperature, adapted for use in selective deposition modeling to form a three-dimensional object, comprising a semi-crystalline mixture of components including a tetra-amide, a mono-amide wax, at least one wax selected from the group consisting of petroleum waxes and synthetic waxes.

45. The phase change composition according to claim 44, further comprising a plasticizer.

46. The phase change composition according to claim 44, wherein there are at least two waxes present which have melting points in the range of 86° C. to 90° C., and 91° C. to 94° C. and 90° C. to 97° C., and 104° C. to 116° C.

47. The phase change composition according to claim 44, wherein there are at least three waxes present which have melting points in the range of 86° C. to 90° C., and 91° C. to 94° C., and 90° C. to 97° C., and 104° C. to 116° C.

48. The phase change composition according to claim 44, wherein there are four waxes present and the melt points of the waxes are in the ranges of 86° C. to 90° C., and 91° C. to 94° C., and 90° C. to 97° C., and 104° C. to 116° C.

49. The phase change composition according to any of claims 1, 8, 18, 24, 31, or 44, further comprising at least one antioxidant.

50. The phase change composition according to any of claims 1, 8, 18, 24, 31, or 44, further comprising a colorant.

51. A phase change composition that is a solid at ambient temperature and a liquid at an elevated temperature above ambient temperature, adapted for use in selective deposition modeling to form a three-dimensional object, comprising a semi-crystalline mixture of components including a tetra-amide, a mono-amide wax, a petroleum wax, a polyethylene wax, an ethylene-propylene copolymer wax, a modified rosin ester, a hydrocarbon based aromatic resin, an alkyl benzene phthalate, at least one antioxidant and at least one colorant.

52. The phase change composition according to claim 51, wherein the tetra-amide is present in an amount of about 5% to about 30% by weight, the mono-amide wax is present in an amount of about 15% to about 40% by weight, the petroleum wax is present in an amount of about 5% to about 25% by weight, the polyethylene wax is present in an amount of up to about 15% by weight, the ethylene-propylene copolymer wax is present in an amount of up to about 10% by weight, the tri-ester is present in an amount of about 10% to about 40% by weight, the aromatic resin is present in an amount of up to about 15% by weight, the alkyl benzene phthalate is present in an amount of up to about 10% by weight, each antioxidant is present in an amount of less than about 1% by weight. and the colorant is present in an amount of no greater than about 2% by weight, all weight percentages being based on the total weight of the composition.

53. The phase change composition according to claim 51, wherein at least two waxes present have melting points in the range of 86° C. to 90° C., and 91° C. to 94° C., and 90° C. to 97° C., and 104° C. to 116° C.

54. The phase change composition according to claim 51, wherein at least three waxes present have melting points in the range of 86° C. to 90° C., and 91° C. to 94° C. and 90° C. to 97° C., and 104° C. to 116° C.

55. The phase change composition according to claim 51, wherein there are four waxes present and the melt points of the waxes are in the ranges of 86° C. to 90° C., and 91° C. to 94° C., and 90° C. to 97° C., and 104° C. to 116° C.

* * * * *